Dec. 16, 1958  L. E. ELLISON  2,864,925
ELECTRICAL CORROSION PROBE

Filed Sept. 24, 1956  2 Sheets-Sheet 1

INVENTOR.
LYNN E. ELLISON
BY Edward N. Say
ATTORNEY

Dec. 16, 1958     L. E. ELLISON     2,864,925
ELECTRICAL CORROSION PROBE

Filed Sept. 24, 1956     2 Sheets-Sheet 2

INVENTOR.
LYNN E. ELLISON
BY
Edward H. Sang
ATTORNEY

United States Patent Office 2,864,925
Patented Dec. 16, 1958

2,864,925
ELECTRICAL CORROSION PROBE

Lynn E. Ellison, Crystal Lake, Ill., assignor to The Pure Oil Company, Chicago, Ill., a corporation of Ohio Application September 24, 1956, Serial No. 611,518

13 Claims. (Cl. 201—63)

This invention relates to corrosion test probes for use with apparatus capable of determining the rate of corrosion of materials of construction in terms of metal loss and, more particularly, to a new form of test probe designed for use at elevated temperatures and pressures.

One of the most practical methods of determining the extent of corrosion in operating equipment is by direct observation of the influence of corrosion under actual service conditions whereby the heterogeneity of the corrosive environment is taken into consideration. Various methods have been devised for this purpose including the placement of a metallic specimen in the corrosive environment on a simple type of hanger, and the more complicated procedure employing a specimen holder to support a number of test specimens in insulated relationship to exclude galvanic contacts. These methods require tedious weighing and re-weighing of the test specimens and have the additional disadvantage of not being applicable to performing corrosion tests in inaccessible places in the process equipment. Furthermore, the results found from weight-loss methods are subject to errors and a large number of specimens are necessary to determine a proper time-corrosion curve.

Accordingly, methods have been devised which make use of the correlation between change in electrical conductivity and change in cross-sectional area to determine the rate of corrosion of materials of construction in a corrosive atmosphere through the use of corrosion test probes connected to electronic resistance-change meters. These instruments, employing resistance bridges, function like analogue computers to indicate quantitatively changes in physical characteristics which cannot be conveniently measured by other methods. One application of such a bridge is described in a co-pending application entitled, "Apparatus for Determining the Influence of Corrosion on Metallic Materials of Construction," bearing Serial Number 528,032, filed August 12, 1955, by G. A. Marsh and E. Schaschl, which relates to means for compensating for temperature changes. In this apparatus, one of the coupons or test specimens in the probe is insulated from the corrosive environment by means of a suitable protective coating. The coupons in the probe are connected so as to comprise one-half of a typical resistance bridge. Suitable electrical connections are made with the other half of the bridge, which is placed outside the corrosive environment along with the power supply to the bridge, and an appropriate electrical meter, such as a galvanometer, functions as a null detector. Loss of metal on the unprotected specimen induces small increases in resistance in the circuit which are correlated with metal loss by appropriate formulae described in the application.

In another co-pending application entitled, "Electronic Resistance-Change Meter," Serial Number 528,061, filed, August 12, 1955, now Patent No. 2,830,265, by the present inventor, there is described an electronic apparatus for conveniently detecting and measuring changes in resistance which provides for the direct reading of the rate of corrosion. The corrosion test probe of the present invention may be used in conjunction with the apparatus described in the foregoing applications. In still another co-pending application by E. Schaschl entitled, "Improved Corrosion Test Probes for Use With Corrosion Testing Apparatus," filed March 1, 1956, and bearing Serial Number 568,906, there are described corrosion test probes of increased rigidity, durability and strength. These probes comprise a non-conducting specimen holder which may be in the form of a ceramic core having test specimens attached to the surface thereof by electrolytic deposition or painted circuit methods. The present corrosion test probe is an improvement over the test probes previously proposed in that it is adapted to be used under conditions of high pressure and high temperature, retains the required strength and durability, and is easy to manufacture.

The primary object of this invention is to provide a corrosion test probe to be used with an electronic resistance-measuring apparatus adapted to determine the corrosivity of environments under conditions of relatively high temperature and high pressure.

Another object of the invention is to provide a new form of corrosion test probe having a simplified U-shaped or spiral-shaped corrodible surface.

These and further objects of the invention will become apparent or be described as the invention is set forth.

The invention is best described by reference to the attached drawings in which.

Figure 3:
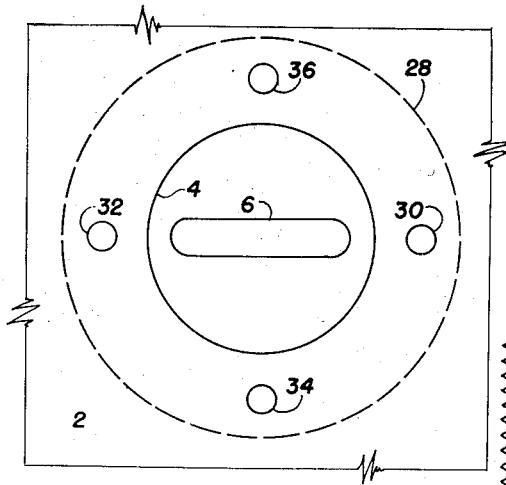
Figure 3 is a top view of the embodiment shown in Figure 1.
Figure 1:
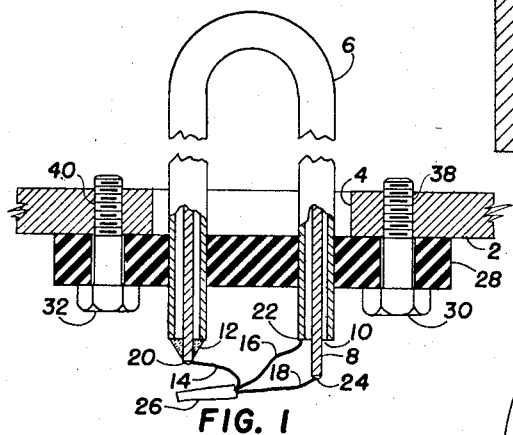
Figure 1 is a side elevation and partial cross-section of one form of test probe shown mounted in an insulating base member which is bolted to the wall of a vessel.
Figure 2:
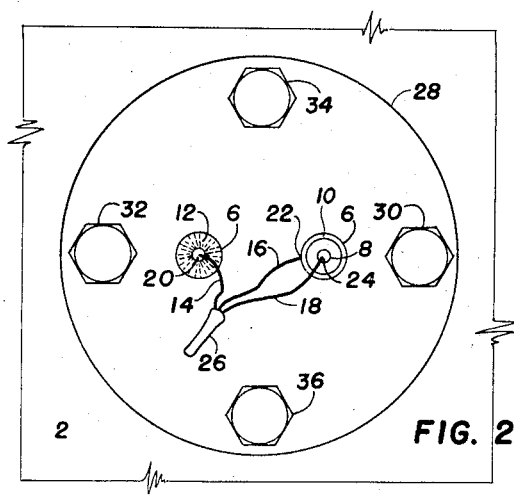
Figure 2 is a bottom view of the assembly shown in Figure 1.
Figure 7:
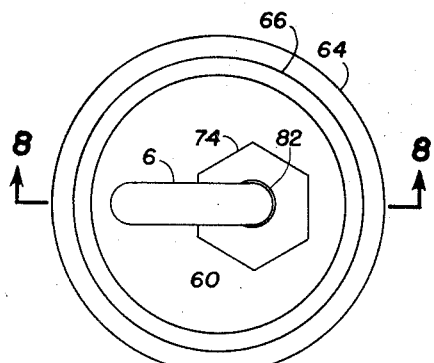
Figure 7 is a top view of the assembly shown in Figure 5.
Figure 8:
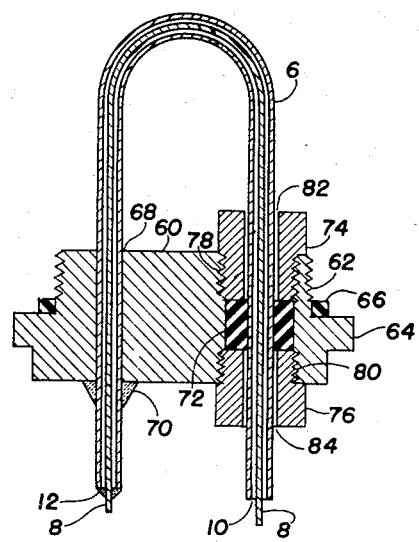
Figure 8 is a vertical cross-sectional view taken along lines 8—8 in Figure 7.
Figure 5:
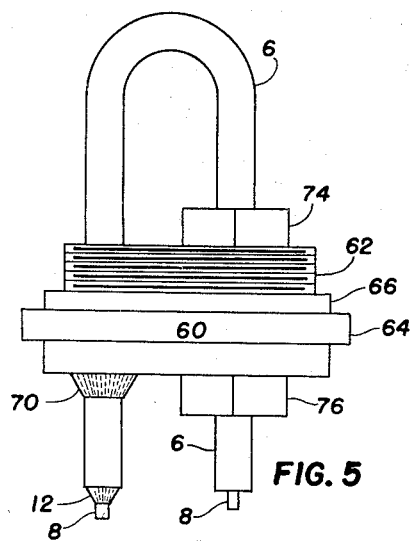
Figure 5 is a side elevation of another form of test probe with one leg of the test element mounted in pressure-sealed and insulated relationship.

Referring to Figures 1, 2 and 3, the wall of the process vessel or conduit 2 has opening 4 therethrough into which tubular test specimen 6 is mounted so as to expose the outer surface of the U-shaped end to the corrosive atmosphere confined by wall 2. A second and protected test specimen, 8, is also U-shaped and extends through the opening within tubular test specimen 6 with its outer wall spaced from the inner wall of 6 forming annular space 10. Test specimens 6 and 8 are so spaced from each other along their entire lengths except at common terminal or welded junction 12. Lead wires 14, 16 and 18 are welded or soldered as at points 20, 22, and 24, respectively, to form connections to a bridge-measuring circuit (not shown). Lead wires 14, 16 and 18 may be formed into insulated cable 26 for this purpose. The parts so far described from one embodiment of a test element wherein a tubular test specimen functions as a protective sheath for an inner, second test specimen mounted in spaced relationship therewith.

Non-conducting and corrosion-resistant base 28 supports test specimen 6 and protected specimen 8 for attachment to wall 2 by means of bolts 30, 32, 34 and 36 which pass through holes in the periphery of base 28 and engage wall 2 by means of threaded portions 38 and 40. The annular space, 10, between substantially concentrically arranged test specimens 6 and 8 may be filled with air or a heat-conducting, non-electrical-conducting material such as small glass beads and plaster. Base member 28 may be molded around the two legs of U-shaped test specimen 6 to form a strong seal along the surface of contact.

Figure 4:
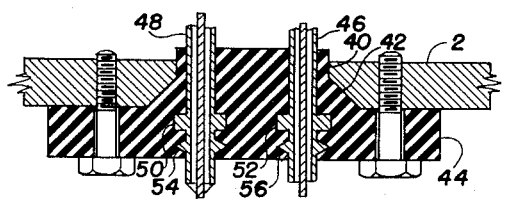
Figure 4 is a cross-sectional view, similar to Figure 1, showing another form of insulating base member into which the test probe elements or specimens of this invention may be mounted and showing a method of mounting.
Figure 6:
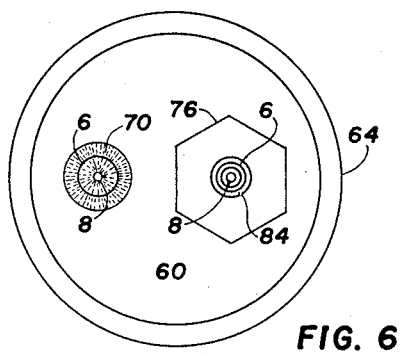
Figure 6 is a bottom view of the assembly shown in Figure 5.

Figure 4 shows another form of test element and base member whereby extended annular sealing means are provided around the legs of the exposed test specimen. In Figure 4, hole 40 through vessel wall 2 has shoulder 42 against which a corresponding shoulder of base member 44 impinges. Legs 46 and 48 of the exposed test specimen have external annular shoulders 50 and 52, respectively, to effectuate a good seal within base member 44. V-shaped shoulders 54 and 56 are also shown for this purpose. Shoulders 50, 52, 54 and 56 extend around the periphery of the imbedded legs, 48 and 46. Other means for providing an extended, irregular sealing surface may be used.

Referring now to Figures 5, 6, 7 and 8, still another arrangement is shown wherein base member 60 is provided in the form of a threaded plug having threads 62, adapted to be inserted into a threaded opening in the wall of a vessel and communicating with the corrosive atmosphere therein to be tested. In these related drawings, exposed test specimen 6 and internal protected test specimen 8 are in the same form as described in connection with Figures 1, 2 and 3. Base member 60 has shoulder 64, accommodating ring seal 66 to provide a pressure seal with the wall of the process vessel. One leg of U-shaped test specimen 6 passes through aperture 68 in base 60 and is soldered or welded thereto, as at 70. The other leg of test specimen 6 is held in insulated and pressure-sealed relationship within base 60 by means of gasket 72 held in place between packing nuts 74 and 76 which are threaded, as at 78 and 80, and engage a threaded aperture passing through base 60. The outer wall of test specimen 6 is spaced from the inner wall of the packing nuts as indicated by annular spaces 82 and 84. The lead wires previously described are omitted from these drawings.

Figure 9:
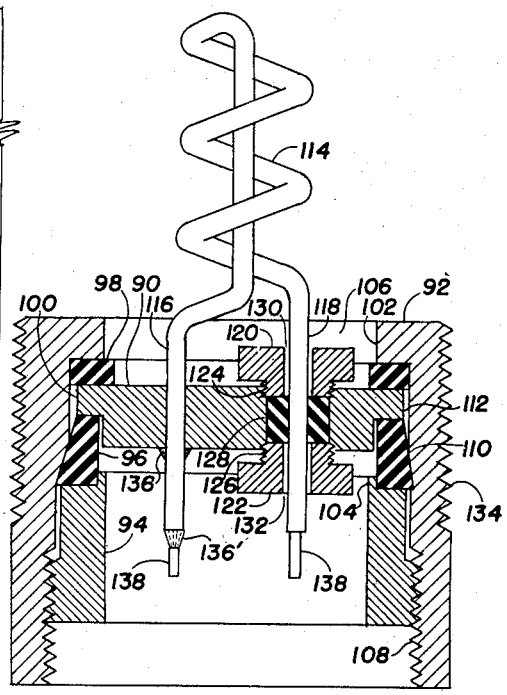
Figure 9 is a cross-sectional view of a modified arrangement of Figure 5 employing a spiral-shaped test specimen and another mode of mounting same.
Figure 10:
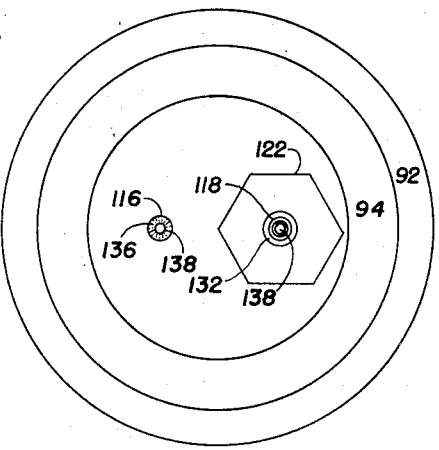
Figure 10 is a bottom view of the embodiment shown in Figure 9.

Referring to Figures 9 and 10, another embodiment is shown utilizing a different form of test specimen. In Figures 9 and 10 provision is made for sealing base member 90 within outer tubular base member 92 by means of annular packing nut 94 engaging annular gaskets 96 and 98 on either side of shoulder 100, retained in place by shoulders 102 and 104, all within aperture 106 and held in place by threads 108 engaging annular packing nut 94. The wall of aperture 106 opposite gasket 96 is conical or beveled to form a better seal as shown at 110. Base member 90 is spaced from base member 92 as indicated at 112.

The two downwardly depending legs of spiral test specimen 114, namely 116 and 118, are held within aperture 106 of base member 90 in the same manner as test specimen 6 is mounted in base 60 shown in Figures 5, 6, 7 and 8. This structure includes packing nuts 120 and 122, cooperating threaded surfaces 124 and 126 and gasket 128, held therebetween. Leg 118 is spaced from packing nuts 120 and 122 as shown at 130 and 132. Base 60, shown in Figures 5 and 8, may be adapted for use with a base member like 92, in which event shoulder 64 will be placed between gaskets 98 and 96. Base 90 is a simplified version of base 60 for use with outer base 92. Threads 134 serve to engage a threaded opening in a vessel wall to place spiral test element 114 within the corrosive atmosphere. Leg 116 is welded at 136 to base 90.

In the embodiment shown in Figure 9, spiral member 114 is the exposed test specimen and is joined at weld or solder point 136 to inner protected element or specimen 138 which is spaced therefrom along the balance of their concentric relationships, as previously described in relation to elements 6 and 8 in the preceding drawings. Although the exposed portion of specimen 114 is shown in spiral configuration, it is contemplated that other forms may be used adapted to give an extended surface for contact with the corrosive atmosphere. As shown in Figure 9, packing nut 94 extends part way into aperture 106. This arrangement makes possible the insertion of a solid plug (not shown) to engage the remaining threads, 108, after removal of the leads, as shown in Figure 9, in the event a leak develops at any of the sealed joints or test specimen 114 corrodes through at any point. This arrangement eliminates the necessity of shutting down the process equipment during such a contingency.

Test specimens 6 and 8 or 114 and 138 are fabricated as a unit and may be of different sizes and different wall thicknesses. Protected specimens 8 and 138 are shown solid but may be formed from tubular material. These specimens are fabricated of the various materials of construction for which determinations are to be made as to resistance to a corroding atmosphere. For this purpose, any type of metal or metal alloy, which will act as a conductor for electricity, may be used. The test specimens may be composed of the same material of construction as wall 2 where it is intended to determine the approximate life of the process vessel itself. Corrosion tests may be made in changing atmospheres and under changing corrosive conditions, as for example during alternate periods of quiescence and on-stream conditions, or during periods of heat input or heat extraction.

In order that the spaced electrically insulated relationship between exposed outer test specimen 6 or 114 and protected inner test specimen 8 or 138 be maintained, the latter may be covered with an electrically insulated material which is a good heat conductor and which will not disintegrate under the heat conditions imposed. The exposed test specimens with their cooperating inner protected specimens may be fabricated in this spaced relationship by inserting the latter in their insulated form within the tubular opening of the former and bending the combined specimens into any desired circuitous shape, such as the U-shape or spiral shown. Following this, the open end indicated at 10 in Figures 1 and 8 may be sealed with a heat resistant cement. If an electrically insulating and heat conducting material, such as a mixture of glass beads and plaster, is used in the annular space between the test specimens, the open end may be sealed with a heat resistant cement.

Exposed test specimens 6 and 114 and protected specimens 8 and 138 have substantially the same resistivity, which means they will have substantially the same chemical composition. This is necessary in order that the bridge-measuring circuit, which is connected thereto by means of leads 14, 16 and 18, through cable 26, may be made to function accurately without tedious calibration. However, it is unnecessary that the configuration or total resistance of the protected and unprotected test specimens be identical. Because the corrosion-measuring process with which the test probe of this invention is used utilizes a comparison method for determining the change in resistance of the unprotected test specimen or resistance element when exposed to corrosive conditions, the bridge circuit in which the test probe is installed during use is initially balanced by adjusting the ratio of the resistance elements. Thus, the exposed test specimen may be generally tubular in shape and preferably cylindrical, although other cross-sectional forms such as triangular, square, hexagonal, may be used.

Any structure of the exposed test specimen may be used as long as it forms an enclosure or housing, the outside of which is exposed to the corrosive atmosphere and has adjacent spaced terminal legs for attachment through an insulated base element. This tubular test specimen acts to seal and protect the inner test specimen from the corrosive atmosphere. The inner test specimen may be any shape or cross-section.

Before use or when new, test specimens 6, 118, 8 and 138 have substantially the same electrical resistivity and chemical composition, and as before stated, are made of the materials of construction under investigation or in use in the process vessel or apparatus for which corrosion rates are desired. Wall thicknesses of from 0.030 to 0.0625 inch, for example, may be used for the tubular test specimens. Where wall thicknesses of the tubular test specimen are about 0.035 inch, the completed test probe may be fabricated so that the distance between the adjacent spaced legs, as 46 and 48 in Figure 4, is between about ½ to 1 inch. The device as described, when fabricated of tubing having an outside diameter of ½" or less, will withstand pressures to about 1100 lbs. per square inch. When the wall thicknesses of the exposed test specimens are increased, or the outside diameters decreased, even higher pressures may be used. The expedient of reinforcing the probe by using heat-conducting and electrically insulating materials within annular space 10 allows the use of the apparatus at even higher pressures. With wall thicknesses of 0.035 inch for test specimen 6, and using a mixture of glass beads and plaster in annular space 10, pressures of as high as 2200 lbs. per square inch may be used. In general, the pressures within the corrosive atmospheres of the test may vary from atmospheric or below to 250 p. s. i. g. without reinforcing the annular space where temperatures of from about 100 to 850° F. are encountered. Upon reinforcing the annular space, the apparatus may be used in corrosive atmospheres at pressures as high as 2500 p. s. i. g. and temperatures up to about 1000° F. The various gaskets and insulators may be made from any electrically insulating, chemically inert materials such as Teflon, Micalex, Fibre, etc. Also, base 28 may be formed of these materials.

As is apparent from the foregoing description, the invention relates to a corrosion test element in which there is provided an exposed tubular test specimen having its ends adjacent to but spaced from each other, and a protected test specimen within and spaced from the tubular test specimen, with or without an insulating base member attached to the adjacent, spaced ends. The invention also encompasses the various forms of test elements combinations comprising an exposed test specimen which acts as a shield for the inner protected test specimen wherein the exposed portion is a circuitous configuration between the adjacent ends with or without a cooperating base element.

Included as embodiments are the structures shown in the drawings and any modifications thereof which become obvious to one skilled in the art. The base member may comprise a simple insulating means which holds the adjacent spaced ends of the tubular exposed element in insulated arrangement, and which is adapted to fasten to or within an aperture in a process vessel or conduit containing a corrosive atmosphere. As shown, at least one of the adjacent ends of the exposed tubular specimen is insulated from the base element, where same is made of electrically conducting material, but both adjacent ends are insulated when the base itself is a non-conductor of electricity. It is obvious that the test element 114 shown in Figures 9 and 10 may be used with base 28 of Figures 1, 2 or with base 64 shown in Figures 5, 6, 7 and 8. Similarly, test element 114 may have its adjacent ends or legs 116 and 118 formed with annular shoulders as shown in Figure 4 so that this manner of mounting may be used. Likewise, test element 6 may be used with bases 90 and 92.

The term "test element" as used in the claims is intended to refer to the combination of an outer exposed test specimen and an inner protected test specimen with which any desired base may be used. The term "test specimen" is intended to indicate the outer exposed tubular member per se or the inner protected member per se without reference to a base element or to the manner in which it is associated with the other parts. The term "test probe" is intended to indicate the entire assembly of test specimens to form a test element and a base member cooperating therewith.

Advantages of course occur in constructing the metal corrosion test element using resistances or test specimens which have the same resistance value. However, suitable unsymmetrical corrosion testing elements can be fashioned in accordance with this invention in which the resistances of these elements are not identical, provided, for the sake of consistency, a material of construction is employed which is substantially uniform in composition and resistivity. The ratio of the resistance of the unprotected test specimen to the resistance of the protected test specimen, expressed as $$\frac{R \text{ unprotected}}{R \text{ protected}}$$

may vary from values of about 0.1 to 10. When a corrosion test element combination is fabricated from test specimens having different resistances within the above ratios, corresponding changes in the values of the resistances of the other branches of the bridge circuit will have to be made. Although, theoretically, the above ratios of resistances could vary over wide limits, as a practical matter there are mechanical and electrical factors which have to be taken into consideration in the design of a suitable corrosion testing unit or probe. Lead resistance, for example, will be appreciable if a small corrosion testing probe is used in which the resistance of one element is only about a tenth or less of the resistance of the other element. This factor is not pronounced in the case of large, unsymmetrical test elements in which the resistance of even the smaller one is large compared with the lead resistance. Lead resistance can be substantially eliminated by the manner of interconnecting the corrosion testing unit with the bridge circuit. Mechanical considerations include making the test probe unit large enough for easy assembly and attachment of the lead wires, and to offset an unbalance in temperature compensation.

From this description it is seen that the invention is necessarily confined to the use of test specimens having the property of conducting electricity and showing a change in resistance proportional to changes in cross-sectional area due to corrosion. The materials of construction that meet these requirements include all metals and metal alloys, such as steel, iron, bronze, brass, copper and the like. The environment to be investigated by the test elements or the completed test probes of this invention may be in any physical state or may exist as a mixture of substances in different physical states. The corrosive environment may be gaseous, vaporous, solid, or semi-solid, or a mixture of these forms of matter. Examples include corrosive gases, such as the halogens, acid or base solutions, flue gases, and mixtures of gases or carrier liquids containing a high content of solids, such as catalyst particles. These environments may be considered to be corrosive either because of their mechanical or chemical effects or combinations of same which result in loss of portions of the exposed test specimen. An example of a corrosive liquid environment would be an acid solution or an ammonia-ammonium nitrate fertilizer solution.

Since the test probe of this invention is designed for use at relatively high pressures and temperatures, care should be exercised in the selection of the materials of construction for the base member and associate parts. The thread and gasket-sealing surfaces should be carefully prepared so as to be without roughness or flaws. Thread-sealing compounds may be used on the threaded surfaces to insure against leaks.

What is claimed is:

1. A corrosion test probe comprising an outer annular externally threaded plug having a shouldered aperture therethrough, an annular gasket against said shoulder, a base member within and spaced from said plug, said base member having an annular peripheral shoulder and two apertures through the body thereof, a second annular gasket within said plug, said first gasket sealing one side of said peripheral shoulder and said second gasket sealing the other side thereof, a packing ring threadably engaging said plug at a point removed from said shoulder therein, said packing ring having a sealing surface against said second gasket, an elongated circuitous corrosion test element having spaced adjacent legs mounted within said two apertures of said base member, said test element comprising two test specimens of substantially the same resistivity and composed of the metallic material of construction for which the rate of corrosion is to be de-determined, one of said test specimens being tubular and the other being mounted within the first in insulated spaced relationship from the sides of the first test specimen, one common leg of said test specimens being joined together and to the wall of its associated aperture of said base, the other common leg being mounted within its associated aperture in pressure-sealed and insulated relationship by means of opposing packing nuts threadably engaged with said aperture and holding a third annular gasket against said leg, and electrical leads extending from said juncture and the spaced termini of each of said test specimen forming said common leg.

2. A corrosion test element adapted for use in determining the corrosivity of environments under superatmospheric conditions by detection of the change in resistivity with change in cross-sectional area of an exposed test speciment comprising, in combination, a tubular test specimen having an extended body portion and adjacent spaced ends, a protected test specimen disposed within said tubular test specimen, one end of said tubular test specimen and the corresponding end of said protected test specimen being joined in a common juncture, the remaining portion of said protected test specimen being spaced in electrically-insulated relationship from the inner wall of the body portion of said tubular test specimen and the other terminal ends of said test specimens being spaced from each other for attachment of electrical leads to a resistance-change measuring circuit.

3. A corrosion test element in accordance with claim 2 in which said body portion is circuitous.

4. A corrosion test element in accordance with claim 3 in which said body portion is U-shaped.

5. A corrosion test element in accordance with claim 3 in which said body portion is spiral-shaped.

6. A corrosion test element in accordance with claim 2 in which the test specimens have substantially the same chemical composition and electrical resistivity.

7. A corrosion test probe adpated for use in determining the corrosivity of environments under superatmospheric conditions by detection of the change in resistivity with change in cross-sectional area of an exposed test specimen comprising, in combination, a tubular test specimen having a body portion and adjacent spaced ends, said ends extending through a transverse support member in pressure-sealed relationship and terminating on one side of said support member, a protected test specimen disposed within and spaced from said tubular test specimen, one end of said tubular test specimen and the corresponding end of said protected test specimen being joined in a common juncture, an electrical lead attached to said common juncture, the other end of said tubular test specimen and said protected test specimen being each connected to an electrical lead for connection to a resistance-change measuring circuit.

8. A corrosion test probe in accordance with claim 7 in which the body portion of said tubular test specimen is circuitous.

9. A corrosion test probe in accordance with claim 8 in which said body portion is U-shaped.

10. A corrosion test probe in accordance with claim 8 in which said body portion is spiral-shaped.

11. A corrosion test probe in accordance with claim 7 in which said transverse support member is an electrical insulator.

12. A corrosion test probe in accordance with claim 7 in which said transverse support member is an electrical conductor, at least one of the ends of said tubular test specimen passes through an insulating gasket within an aperture through said support member, and means are provided for compressing said gasket against said tubular test specimen.

13. A corrosion test probe in accordance with claim 12 in which said support member has a circumferential outwardly extending shoulder and said shoulder is carried in insulated and pressure-sealed relationship by opposing, spaced circumferential sealing means within said collar.

References Cited in the file of this patent

UNITED STATES PATENTS

| | | |
|---|---|---|
| 596,160 | Helberger | Dec. 28, 1897 |
| 1,263,350 | Schneider | Apr. 16, 1918 |
| 1,522,992 | Abbott | Jan. 13, 1925 |
| 2,625,634 | Temple | Jan. 13, 1953 |